United States Patent [19]

Inoue et al.

[11] Patent Number: 5,977,358

[45] Date of Patent: Nov. 2, 1999

[54] ASYMMETRIC DIOXAZINE COMPOUNDS, INTERMEDIATE COMPOUNDS THEREFOR AND APPLICATION OF THE ASYMMETRIC DIOXAZINE COMPOUNDS

[75] Inventors: Masato Inoue; Junya Hada, both of Toyonaka; Toshiyuki Araki, Hirakata, all of Japan

[73] Assignee: Sumitomo Chemical Company, Limited, Osaka, Japan

[21] Appl. No.: 09/115,593

[22] Filed: Jul. 15, 1998

[30] Foreign Application Priority Data

Jan. 24, 1996 [JP] Japan .................................. 8-010425

[51] Int. Cl.$^6$ ................................................. C07D 498/22
[52] U.S. Cl. ................................................. 544/76; 544/77
[58] Field of Search .......................................... 544/76, 77

[56] References Cited

U.S. PATENT DOCUMENTS

| | | | |
|---|---|---|---|
| 4,604,459 | 8/1986 | Jager .......................................... | 544/76 |
| 5,171,852 | 12/1992 | Renfrew et al. ............................. | 544/76 |
| 5,272,267 | 12/1993 | Miyamoto et al. .......................... | 544/76 |

FOREIGN PATENT DOCUMENTS 0385120  4/1995  European Pat. Off. .

*Primary Examiner*—Robert W. Ramsuer
*Assistant Examiner*—Dominic Keating

*Attorney, Agent, or Firm*—Stevens, Davis, Miller & Mosher, L.L.P.

[57] ABSTRACT

An asymmetric dioxazine compound represented, when shown in free acid form, by the general formula (I):

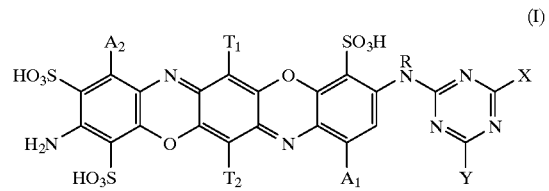

wherein $T_1$ and $T_2$ represent a hydrogen atom, a chlorine atom, a bromine atom, a lower alkyl group, a phenoxy group or others, $A_1$ represents an alkyl group, a chlorine atom, a carboxyl group or others, $A_2$ represents a hydrogen atom, an alkyl group, a chlorine atom, a carboxyl group or others, R represents a hydrogen atom or a lower alkyl group, X and Y represent a halogen atom, a fiber-reactive group or others, respectively, with the proviso that at least one of X and Y is a fiber-reactive group is provided.

The compound is suitable for dyeing or printing of a fiber material or the like which has a hydroxy group and/or an amide group, and provides a blue-dyed product with various fastness, including particularly chlorine fastness.

1 Claim, No Drawings

ASYMMETRIC DIOXAZINE COMPOUNDS, INTERMEDIATE COMPOUNDS THEREFOR AND APPLICATION OF THE ASYMMETRIC DIOXAZINE COMPOUNDS

BACKGROUND OF THE INVENTION

1. Field of the Invention

The present invention relates to asymmetric dioxazine compounds suitable for dyeing or printing of fiber materials or the like which have a hydroxy group and/or an amide group, intermediate compounds therefor and an application of said asymmetric dioxazine compounds to fiber materials.

2. Background Information

Symmetric triphenodioxazine compounds having the same number of sulfonic acid groups on benzene rings at both ends and reactive dyes having a symmetric triphenodioxazine ring derived from said compounds as the intermediates are known compounds and known reactive dyes, respectively, disclosed in, for example, JP-A-61-14265.

The above known reactive dyes had problems that, when they were applied to a fiber material which has a hydroxy group and/or an amide group, various fastness, including particularly chlorine fastness, were not satisfactory.

As the result of extensive studies for solving the above described problems, the present inventors have discovered that a blue dyed product or printed product which is excellent in various fastness including chlorine fastness and coloring ability can be obtained when a specific asymmetric compound having a sulfonic acid group and an amino group substituted with a triazine ring which has a fiber-reactive group at position 1 and position 2, respectively, of the triphenodioxazine nucleus and further having an amino group at position 9 of the triphenodioxazine nucleus and two sulfonic acid groups substituted at ortho positions to said amino group is used as a reactive dye, and have completed the present invention.

SUMMARY OF THE INVENTION

Thus, the present invention provides (i) an asymmetric dioxazine compound represented, when shown in free acid form, by the general formula (I):

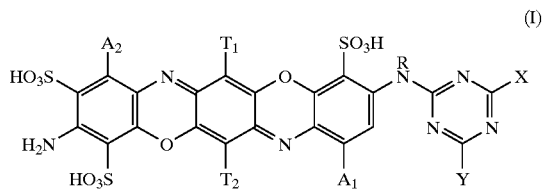

(I)

wherein $T_1$ and $T_2$ are the same or different and represent each a hydrogen atom, a chlorine atom, a bromine atom, a $C_1$–$C_4$ alkyl group, a $C_1$–$C_4$ alkoxy group or a phenoxy group, $A_1$ represents a $C_1$–$C_4$ alkyl group, a $C_1$–$C_4$ alkoxy group, a chlorine atom, a bromine atom or a carboxyl group, $A_2$ represents a hydrogen atom, a $C_1$–$C_4$ alkyl group, a $C_4$–$C_4$ alkoxy group, a chlorine atom, a bromine atom or a carboxyl group, R represents a hydrogen atom or a lower alkyl group which may be substituted, X represents a halogen atom, a lower alkoxy group which may be substituted, an amino group which may be substituted or a group represented by the formula (II):

—N($R_1$)—$W_1$—$Z_1$ (II)

wherein $R_1$ represents a hydrogen atom or a lower alkyl group which may be substituted, $W_1$ represents an alkylene group which may be substituted, a phenylene group which may be substituted or a naphthylene group which may be substituted and $Z_1$ represents a group of the formula:

—$SO_2$—CH=$CH_2$ or —$SO_2CH_2CH_2Z'$ wherein Z' represents a group removable by the action of an alkali, Y represents a halogen atom, a lower alkoxy group which may be substituted, an amino group which may be substituted or a group represented by the formula (III):

—N($R_2$)—$W_2$—$Z_2$ (III)

wherein $R_2$ represents a hydrogen atom or a lower alkyl group which may be substituted, $W_2$ represents an alkylene group which may be substituted, a phenylene group which may be substituted or a naphthylene group which may be substituted and $Z_2$ represents a group of the formula:

—$SO_2$—CH=$CH_2$ or —$SO_2CH_2CH_2Z''$ wherein Z" represents a group removable by the action of an alkali, with the proviso that at least one of X and Y is a halogen atom, a group represented by the formula (II) or a group represented by the formula (III).

In this specification, the term "lower" used as a qualifier or a group means "preferably having one to six carbon atoms."

The present invention also provides (ii) an asymmetric riphenodioxazine compound, as an intermediate for the asymmetric dioxazine compound described in the above (i), which is represented, when shown in free acid form, by the general formula (IV):

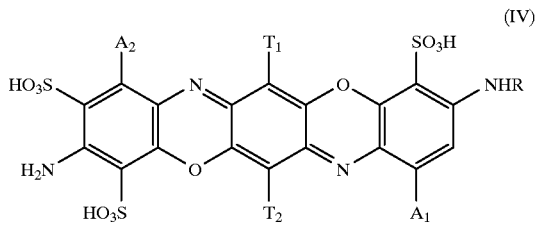

(IV)

wherein $T_1$, $T_2$, R, $A_1$ and $A_2$ each have the same meaning as described above.

The present invention further provides (iii) a process for dyeing or printing of a fiber material which comprises using the asymmetric dioxazine compound described in the above (i).

DETAILED DESCRIPTION OF THE INVENTION

In the general formula (I), the $C_1$–$C_4$ alkyl group represented by $T_1$, $T_2$, $A_1$ and $A_2$ includes straight or branched chain alkyl groups, among which methyl group, ethyl group and n-propyl group are particularly preferred. The $C_1$–$C_4$ alkoxy group represented by $T_1$, $T_2$, $A_1$ and $A_2$ includes straight or branched chain alkoxy groups, among which methoxy group, ethoxy group and n-propoxy group are particularly preferred.

$T_1$ and $T_2$ are the same or different and preferably chlorine atom or bromine atom.

$A_1$ is preferably a $C_1$–$C_4$ alkyl group or a $C_1$–$C_4$ alkoxy group, and $A_2$ is preferably hydrogen atom.

The lower alkyl group represented by R, $R_1$ or $R_2$ is more preferably a substituted or unsubstituted $C_1$–$C_4$ alkyl group of straight or branched chain. Examples of said $C_1$–$C_4$ alkyl group include methyl group, ethyl group, n-propyl group, isopropyl group and n-butyl group.

Preferred examples of substituents on the above described lower alkyl group include hydroxy, cyano, $C_1$–$C_4$ alkoxy, halogen, carbamoyl, carboxyl, alkoxy($C_1$–$C_4$)carbonyl, alkyl($C_1$–$C_4$)carbonyloxy, sulfo and sulfamoyl.

Such substituted lower alkyl group includes, for example, 2-hydroxyethyl group, 2-hydroxypropyl group, 3-hydroxypropyl group, 3-hydroxybutyl group, 4-hydroxybutyl group, 2,3-dihydroxypropyl group, 3,4-dihydroxybutyl group, cyanomethyl group, 2-cyanoethyl group, 3-cyanopropyl group, methoxymethyl group, ethoxymethyl group, 2-methoxyethyl group, 2-ethoxyethyl group, 3-methoxypropyl group, 3-ethoxypropyl group, 2-hydroxy-3-methoxypropyl group, chloromethyl group, bromomethyl group, 2-chloroethyl group, 2-bromoethyl group, 3-chloropropyl group, 3-bromopropyl group, 4-chlorobutyl group, 4-bromobutyl group, carboxymethyl group, 2-carboxyethyl group, 3-carboxypropyl group, 4-carboxybutyl group, 1,2-dicarboxyethyl group, carbamoylmethyl group, 2-carbamoylethyl group, 3-carbamoylpropyl group, 4-carbamoylbutyl group, methoxycarbonylmethyl group, ethoxycarbonylmethyl group, 2-methoxycarbonylethyl group, 2-ethoxycarbonylethyl group, 3-methoxycarbonylpropyl group, 3-ethoxycarbonylpropyl group, 4-methoxycarbonylbutyl group, 4-ethoxycarbonylbutyl group, methylcarbonyloxymethyl group, ethylcarbonyloxymethyl group, 2-methylcarbonyloxyethyl group, 2-ethylcarbonyloxyethyl group, 3-methylcarbonyloxypropyl group, 3-ethylcarbonyloxypropyl group, 4-methylcarbonyloxybutyl group, 4-ethylcarbonyloxybutyl group, sulfomethyl group, 2-sulfoethyl group, 3-sulfopropyl group, 4-sulfobutyl group, sulfamoylmethyl group, 2-sulfamoylethyl group, 3-sulfamoylpropyl group, 4-sulfamoylbutyl group, and the like.

Preferred R is hydrogen atom.

Examples of the halogen atom represented by X and Y include fluorine, chlorine and bromine.

The lower alkoxy group represented by X and Y is more preferably a substituted or unsubstituted $C_1$–$C_4$ alkoxy group of straight or branched chain. Particularly, substituted or unsubstituted methoxy group, ethoxy group and the like are preferred.

Examples of the groups substituted on the lower alkyl moiety of such lower alkoxy group include hydroxy, cyano, halogen and sulfo.

Among the amino group represented by X and Y, examples of substituted amino groups include alkyl($C_1$–$C_6$) amino; $C_2$–$C_8$ N,N-dialkylamino; cycloalkyl($C_5$–$C_7$)amino; aralkyl($C_7$–$C_{10}$)amino; aryl($C_6$–$C_{12}$)amino; mixed substitution amino groups such as N-alkyl($C_1$–$C_6$)-N-cyclohexylamino, N-alkyl($C_1$–$C_6$)-N-aralkyl($C_7$–$C_{10}$)amino and N-alkyl($C_1$–$C_6$)-N-aryl($C_6$–$C_{12}$) amino; amino groups substituted with an aryl group, such as phenyl and naphthyl, which contains a heterocyclic group as a substituent (the heterocyclic group may be of aromatic or non-aromatic and may further have condensed carbocyclic ring of aromatic or non-aromatic); and amino group in which the amino nitrogen atom is a member of a heterocyclic ring which may optionally contain another hetero atom such as oxygen, nitrogen and sulfur.

The alkyl group substituted on the amino group represented by X or Y is preferably $C_1$–$C_4$ straight or branched chain. The cycloalkyl, aralkyl and aryl group substituted on the amino group represented by X or Y are preferably cyclohexyl, benzyl or phenethyl, and phenyl or naphthyl, respectively. Further, the heterocyclic group substituted on the aryl group which is contained in the amino group represented by X or Y may be the residue of a heterocyclic compound such as furan, thiophene, pyrazol, pyridine, pyrimidine, quinoline, benzimidazole, benzothiazole and benzoxazole. Preferred examples of the amino group in which the amino nitrogen atom is a member of a heterocyclic ring include a residue of 6-membered heterocyclic ring compound which may optionally contain oxygen, nitrogen or sulfur.

The above described cycloalkyl group, aralkyl group, aryl group, aryl group having a heterocyclic ring group and heterocyclic group containing nitrogen atom of the amino group may be further substituted with one, two or three substituents selected from the group consisting of halogeno, nitro, cyano, trifluoromethyl, sulfamoyl, carbamoyl, $C_1$–$C_4$ alkyl, $C_1$–$C_4$ alkoxy, alkyl($C_1$–$C_4$)carbonylamino, ureido, hydroxy, carboxyl, sulfomethyl, β-sulfatoethylsulfonyl, vinylsulfonyl, β-chloroethylsulfonyl, β-hydroxyethylsulfonyl, β-hydroxyethyl-sulfonylethyloxy, dimethylamino, sulfo and the like.

The alkyl group may be substituted with one, two or three groups selected from the group as described above except $C_1$–$C_4$ alkyl.

Specific examples of substituted amino groups represented by X and Y include amino groups substituted with an aliphatic straight or branched chain alkyl such as methylamino, hydroxymethylamino, hydroxyethylamino, ethylamino, propylamino, butylamino, β-methoxyethylamino, β-ethoxyethylamino, γ-methoxypropylamino, N,N-dimethylamino, N,N-dihydroxymethylamino, N,N-diethylamino, β-chloromethylamino, β-cyanoethylamino, N,N-di-β-hydroxyethylamino, β-hydroxyethylamino, γ-hydroxypropylamino, N-β-sulfoethyl-N-methylamino, β-carboxyethylamino or β-sulfoethylamino; cycloalkyl amino such as cyclohexylamino; aralkyl-substituted amino or aryl-substituted amino such as benzyl amino, phenetidino, anilino, toluidino, xylidino, chloroanilino, anisidino, 2-, 3- or 4-sulfoanilino, 2,4- or 2,5-disulfoanilino, sulfomethylanilino, N-sulfomethylanilino, 3- or 4-carboxyanilino, 2-carboxyl-5-sulfoanilino, 2-carboxyl-4-sulfoanilino, 2-methoxy-5-sulfoanilino, 2-methyl-5-sulfoanilino, 2-methyl-4-sulfoanilino, 2-methoxy-4-sulfoanilino, 3-methoxy-4-sulfoanilino, 2,4-dimethoxyanilino, 2,4-dimethoxy-5-sulfoanilino, 4-sulfonaphthyl-(1)-amino, 3,6-disulfonaphthyl-(1)-amino, 3,6,8,-trisulfonaphthyl-(1)-amino, 4,6,8,-trisulfonaphthyl-(1)-amino, 6-sulfonaphthyl-(2)-amino, 4,8-disulfonaphthyl-(2)-amino, 3,6,8-trisulfonaphthyl-(2)-amino, 4,6,8-trisulfonaphthyl-(2)-amino or the like; mixed substitution amino such as N-methyl-N-phenylamino, N-ethyl-N-phenylamino, N-propyl-N-phenylamino, N-isopropyl-N-phenylamino, N-butyl-N-phenylamino, N-β-cyanoethyl-N-phenylamino, N-ethyl-2-methylanilino, N-ethyl-4-methylanilino, N-ethyl-3-methylanilino, N-ethyl-3-sulfoanilino or N-ethyl-4-sulfoanilino; amino group having an aryl group containing heterocyclic ring group such as furan, thiophene, pyrazol, pyridine, pyrimidine, quinoline, benzimidazole, benzothiazole or benzoxazole (specific examples for such amino group include residues of amines described in Examples 8, 9, 17 and 18 on pages (10) and (11) of JP-A-4-224869); and residues in which the amino nitrogen atom is a member of a 6-membered heterocyclic ring such as morpholino, piperidino or piperazino.

Particularly preferred examples of the amino groups represented by X and Y include unsubstituted amino group, methylamino group, hydroxymethylamino group, ethylamino group, β-hydroxyethylamino group, N,N-di-β-hydroxyethylamino group, cyclohexylamino group, N-methyl-N-phenylamino group, N-ethyl-N-phenylamino group, N-ethyl-2-methylanilino group, N-ethyl-4-methylanilino group, N-ethyl-3-sulfoanilino group, N-ethyl-4-sulfoanilino group, anilino group, toluidino group, xylidino group, chloroanilino group, anisidino group, phenetidino group, 2-, 3- or 4-sulfoanilino group, 2,4- or 2,5-disulfoanilino group, 2-methoxy-5-sulfoanilino group, 2-methyl-5-sulfoanilino group, 3,6-disulfonaphthyl-(1)-amino group, 3,6,8-trisulfonaphthyl-(1)-amino group, 4,8-disulfonaphthyl-(2)-amino group, 3,6,8-trisulfonaphthyl-(2)-amino group, pyridyl-(2)-amino group, morpholino group, piperidino group, piperazino group, N-β-sulfoethyl-N-methylamino group, β-carboxyethylamino group and β-sulfoethylamino group.

Examples of the alkylene group represented by $W_1$ and $W_2$ include —$(CH_2)_2$—, —$(CH_2)_3$— and —$(CH_2)_2$—O—$(CH_2)_2$—. Examples of the phenylene group represented by $W_1$ and $W_2$ include phenylene group which may preferably be substituted with one or two substituents selected from the group consisting of methyl, ethyl, methoxy, ethoxy, chlorine, bromine and sulfo. Examples of the naphthylene group represented by $W_1$ and $W_2$ include naphthylene which may preferably be substituted with a sulfo group.

Examples of the above described phenylene group and naphthylene group include groups represented by the following formulas:

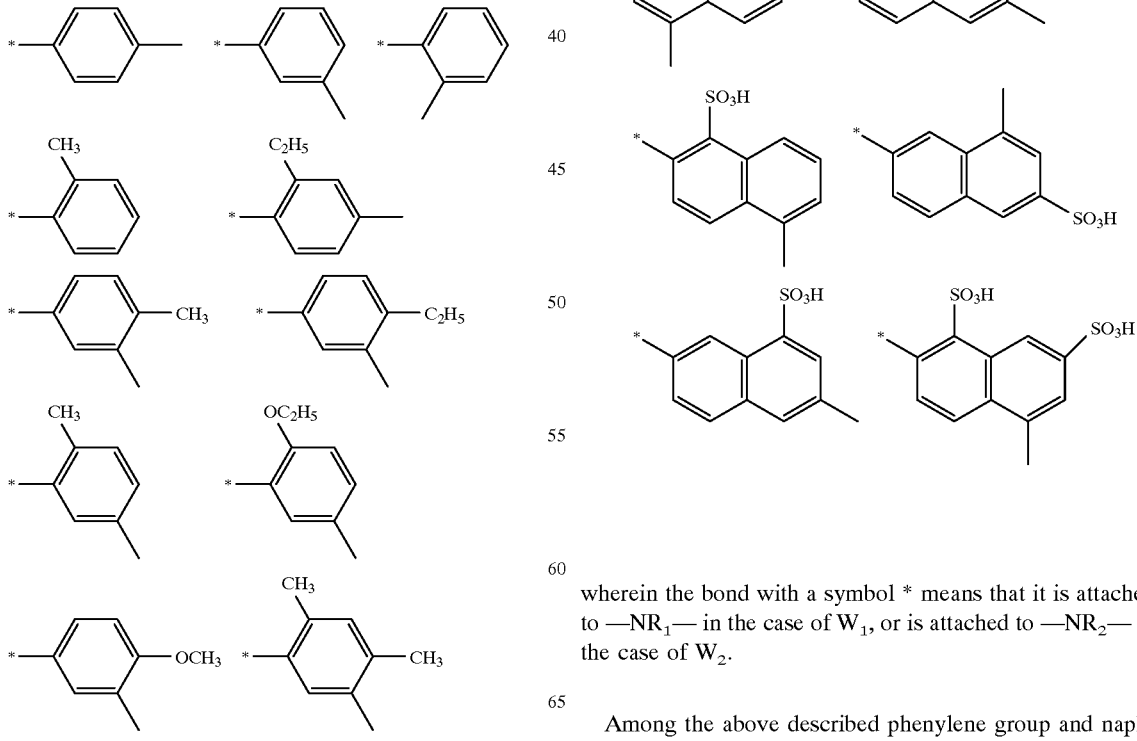

wherein the bond with a symbol * means that it is attached to —$NR_1$— in the case of $W_1$, or is attached to —$NR_2$— in the case of $W_2$.

Among the above described phenylene group and naphthylene group, following groups are preferred:

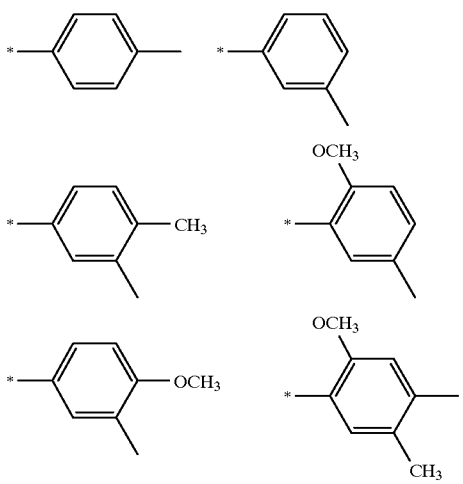

As the groups represented by $W_1$ and $W_2$, an alkylene group of —$(CH_2)_2$— and a group of

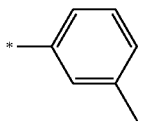

are particularly preferred.

Examples of the group removable by the action of an alkali and represented by Z' and Z" include sulfate ester, thiosulfate eater, phosphate ester, acetate ester and halogen. Among them, sulfate ester is particularly preferred.

Among the asymmetric dioxazine compounds represented by the general formula (I) of the present invention, preferred from the view point of dyeing performance is a compound represented by the following formula (Ia):

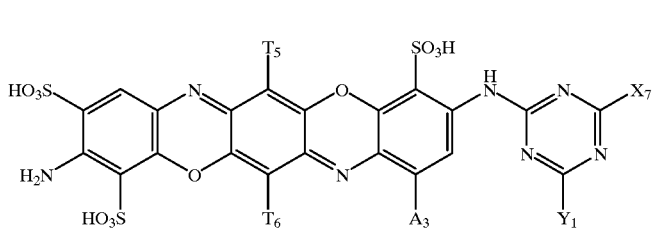

(Ia)

wherein $T_5$ and $T_6$ are the same or different and represent each a chlorine atom or a bromine atom, $A_3$ represents a $C_1$–$C_4$ alkyl group or a $C_1$–$C_4$ alkoxy group, $X_7$ represents an amino group which may be substituted or a group represented by the formula (II) described above and $Y_1$ represent a group represented by the formula (III) described above.

Preferred examples of groups represented by $A_3$, $X_7$ and $Y_1$ in the general formula (Ia) are same as the preferred examples of groups represented by $A_1$, X and Y in the general formula (I), respectively.

The asymmetric dioxazine compounds represented by the general formula (I) of the present invention usually exist in the form of the free acid or in the form of a salt with an alkali metal, an alkaline earth metal or the like. Preferably, they exist in the form of a sodium salt, potassium salt or lithium salt.

The asymmetric dioxazine compounds represented by the general formula (I) of the present invention can be produced, for example, by condensing the above described asymmetric riphenodioxazine compound of the general formula (IV), compound of the general formula (V):

$$H—X' \tag{V}$$

wherein X' represents a lower alkoxy group which may be substituted, an amino group which may be substituted or a group represented by the formula (II) described above, and a compound of the general formula (VI):

$$H—Y' \tag{V}$$

wherein Y' represents a lower alkoxy group which may be substituted, an amino group which may be substituted or a group represented by the formula (III) described above with 2,4,6-trihalogeno-s-triazine.

In the above described condensation with 2,4,6-s-triazine, the order of the reaction is not particularly limited. Although the reaction condition is also not particulrly limited, the first condensation is preferably carried out at a temperature of –10° C. to 40° C. and a pH of 2 to 9, the second condensation is preferably carried out at a temperature of 0° C. to 70° C. and a pH of 2 to 9, and the third condensation is preferably carried out at a temperature of 10° C. to 100° C. and a pH of 2 to 7.

The asymmetric triphenodioxazine compounds of the general formula (IV) can be produced, for example, by condensing a 1,4-benzoquinone represented by the formula (VII):

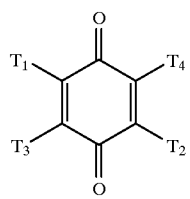

(VII)

wherein $T_1$ and $T_2$ are same as described above, and $T_3$ and $T_4$ represent a halogen atom,
with a diaminobenzene monosulfonic acid compound represented by the formula (VIII):

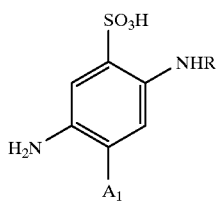

(VIII)

wherein R and $A_1$ are same as described above, and a diaminobenzene disulfonic acid compound represented by the formula (IX):

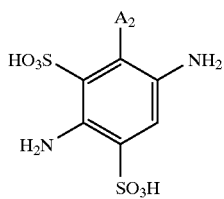

(IX)

wherein $A_2$ is same as described above, to obtain a dianilide compound represented by the formula (X):

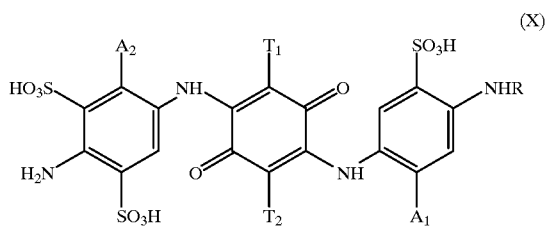

(X)

wherein $T_1$, $T_2$, R, $A_1$ and $A_2$ are same as described above, and then cyclizing the said compound, in the presence of an oxidizing agent if necessary.

The asymmetric dioxazine compounds represented by the general formula (I) of the present invention have the fiber-reactivity and can be used for dyeing or printing of hydroxy group-containing and/or amido group-containing materials. The materials are preferably used in the form of a fiber material or in the form of a textile blend thereof.

Examples of the hydroxyl group-containing materials include natural or synthetic hydroxyl group-containing materials such as cellulose fiber materials, regenerated product thereof and polyvinyl alcohol. Preferred examples of cellulose fiber materials include cotton and other vegetable fibers such as linen, flax, jute and ramie fibers. The regenerated cellulose fiber includes viscose staple, filament viscose and the like.

Examples of the amido group-containing materials include synthetic or natural polyamides and polyurethanes. Preferably, the amido group-containing materials are in the form of a fiber such as wool, other animal fiber, silk, leather, polyamide-6,6, polyamide-6, polyamide-11 and polyamide-4.

The asymmetric dioxazine compounds represented by the general formula (I) of the present invention can be aplied onto the above described materials, particularly onto the above described fiber materials, by a dyeing or printing method according to their physical and chemical properties.

For example, an exhaustion dyeing of a cellulose fiber is carried out at a relatively low temperature in the presence of an acid binding agent such as sodium carbonate, trisodium phosphate and sodium hydroxide, sometimes with addition of a neutral salt such as sodium sulfate or sodium chloride, and optionally using a solubilizing aid, a penetrating agent or a leveling agent. The neutral salt which promotes exhaustion of the dye can be added after or before the temperature reaches the prescribed dyeing temperature, sometimes in divided portions.

The dyeing of a cellulose fiber according to a padding process can be carried out by padding the fiber at a room temperature or at an elevated temperature, followed by drying the fiber and, then, fixing the product by means of steaming or dry-heating.

The printing of a cellulose fiber can be carried out either in one phase method, for example, by printing the fiber with a printing paste containing sodium hydrogen carbonate or another acid binding agent and then steaming the product at 100–160° C., or alternatively in two-phase method, for example, by printing the fiber with a neutral or weakly acidic printing paste, followed by passing the product through an electrolyte-containing hot alkaline bath or overpadding with an alkaline electrolyte-containing padding solution, and then steaming or dry-heating.

As the printing paste, a paste and an emulsifier such as sodium alginate and starch ether may be used. They may be used in combination with printing aid such as urea and/or dispersing agent if necessary.

Examples of the acid binding agent suitable for fixing the compound of the present invention on a cellulose fiber include a water soluble basic salt formed by an alkali metal or an alkaline earth metal with an inorganic or organic acid or a compound capable of releasing alkali under heating. Particularly, it includes a salt of an alkali metal hydroxide and an alkali metal salt of a weak or medium inorganic or organic acid. Among the alkali metal salt, a sodium salt and potassium salt are preferred. Examples of such acid binding agent include sodium hydroxide, potassium hydroxide, sodium hydrogen carbonate, sodium carbonate, sodium formate, potassium carbonate, mono-, di- or tri-sodium phosphate, sodium silicate and sodium trichloroacetate.

Dyeing of a synthetic or natural polyamide or polyurethane fiber can be carried out by exhausting the dye from an acidic or weakly acidic dye bath under a controlled pH, then changing pH to neutral or sometimes to alkaline side in order to fix. The dyeing may usually be carried out at a temperature of 60–120° C. For level dyeing, a conventional leveling agent, such as a condensation product of cyanuryl chloride and 3 times the mole of aminobenzene sulfonic acid or aminonaphthalene sulfonic acid or an addition product of stearyl amine and ethylene oxide, can be added.

The asymmetric dioxazine compounds represented by the general formula (I) of the present invention are characterized in that it exhibits excellent properties in dyeing and printing of fiber materials. Particularly, they are suitable for dying of cellulose fiber materials and they give a good light fastness, a good perspiration-light fastness, a good wet fastness such as washing resistance, peroxide-washing resistance, perspiration resistance, acid-hydrolysis resistance and alkali fastness, an excellent chlorine fastness, an excellent NOx (nox) fastness, a good abrasion resistance and a good ironing resistance.

Also, they are characterized in that they exhibit an excellent build-up property, leveling property and washing-off property and further a good solubility and exhaustion-fixing property. Further, they are characterized in that they are less sensitive to variation of dyeing temperature or dyeing bath ratio and give a dyed product of stable quality.

Still further, they are characterized in that they can provide a product which are less changeable in shade during the fixing treatment or resin treatment of the dyed product and less changeable by contact with a basic substance during storage.

The asymmetric dioxazine compounds represented by the general formula (I) of the present invention are accordingly useful as the reactive dye particularly for cellulose fibers and the asymmetric triphenodioxazine compounds represented by the general formula (IV) are useful as the intermediates for the above described asymmetric dioxazine compounds.

EXAMPLES

The present invention will now be described in more specifically based on the following Examples. In Examples, parts and % mean parts by weight and % by weight, respectively.

Example 1

Into water were dissolved 80.5 parts of 1,4-phenylenediamine-2,6-disulfonic acid and 65.5 parts of 1,4-phenylenediamine-2-methoxy-5-sulfonic acid. Then, 73.8 parts of chloranil was added and the mixture was adjusted to pH 4–8 at the room temperature and stirred until the reaction was completed. The mixture was subjected to salting-out and the formed crystals were separated and dried. The obtained dianilide compound was represented by the following structure, when shown in free acid form:

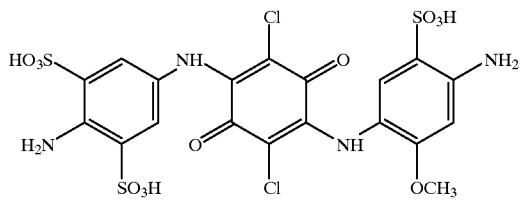

To 4,500 parts of 3–30% fuming sulfuric acid was added 70.0 parts of the dianilide compound at 0–15° C. and the mixture was stirred at 15–40° C. until the reaction was completed. Thereafter, the reaction solution was poured into ice-water and precipitated crystals were filtered. The obtained cake was mixed with water and the mixture was adjusted to pH 3–6 with sodium hydroxide. Then the mixture was subjected to salting-out with sodium chloride and the precipitated crystals were separated by filtration. The obtained asymmetric triphenodioxazine compound had a structure of the following formula (XI), when shown in free acid form:

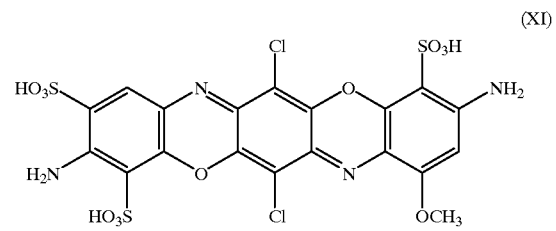

(λmax: 600 nm, in an aqueous solvent; the same is applied hereinafter)

Into 1,500 parts of water was dissolved 63.2 parts of the asymmetric triphenodioxazine compound thus obtained, and 19.0 parts of cyanuric chloride was added thereto at a temperature of 5–30° C. The mixture was stirred until the reaction was completed while keeping pH at 2–7 with a sodium carbonate solution. Then, 12.4 parts of taurine was added thereto and the reaction was continued at 10–50° C. keeping pH at 2–6. The obtained asymmetric dioxazine compound of the present invention had the following formula (XII), when shown in free acid form:

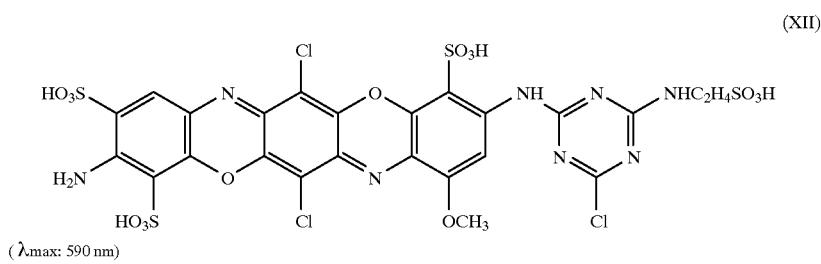

(λmax: 590 nm)

Into water was dissolved 80.6 parts of the compound of the formula (XII), and 24.3 parts of 1-aminobenzene-3-β-sulfatoethylsulfone was added thereto. The temperature of the mixture was elevated to 50–70° C. while keeping pH at 2–5, and the mixture was stirred under the same conditions until the reaction was completed. After cooling the mixture to the room temperature, potassium chloride was added to the mixture and precipitated crystals were isolated. The compound was another symmetric dioxazine compound of the present invention having a structure of the following formula (XIII), when shown in free acid form:

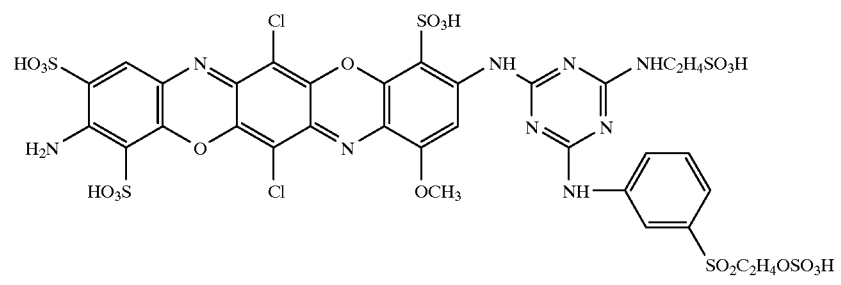

(XIII)

(λmax: 595 nm)

Example 2

The procedure in Example 1 was repeated except that chloranil was replaced by bromanil to give the corresponding dianilide compound and an asymmetric triphenodioxazine compound which was a cyclization product of the dianilide compound. Then, cyanuric chloride, taurine and 1-aminobenzene-3-β-sulfatoethylsulfone were reacted thereon in this order according to the same manner as that in Example 1 and the obtained reaction solution was treated with potassium chloride to precipitate crystals, which were isolated. The product was an asymmetric dioxazine compound of the present invention having the following structure, when shown in free acid form:

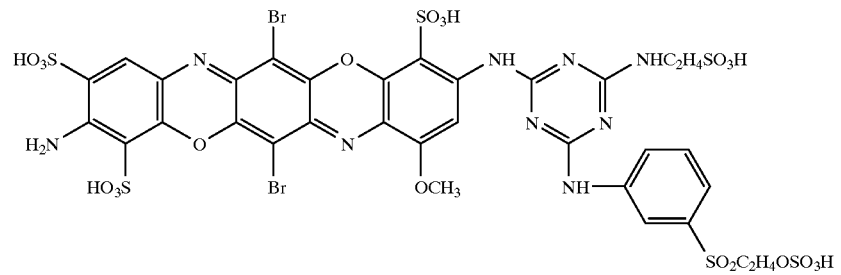

(λmax: 595 nm)

Example 3

The procedure in Example 1 was repeated except that 1,4-phenylenediamine-2-methoxy-5-sulfonic acid was replaced by an equimolar amount of 1,4-phenylenediamine-2-methyl-5-sulfonic acid to give an asymmetric triphenodioxazine compound corresponding to the above described formula (XI). (In this specification, "compound corresponding to the formula" or "compound corresponding to that of the formula" means that "compound which is same to a compound represented by the formula except that one of some groups are substituted with other groups as is clear from the above described production process.) Then, cyanuric chloride, taurine and 1-aminobenzene-3-β-sulfatoethylsulfone were reacted thereon in this order in the same manner as that in Example 1 and the obtained reaction solution was treated with potassium chloride to precipitate crystals, which were isolated. The compound was an asymmetric dioxazine compound having the following formula (XIV), as shown in free acid form:

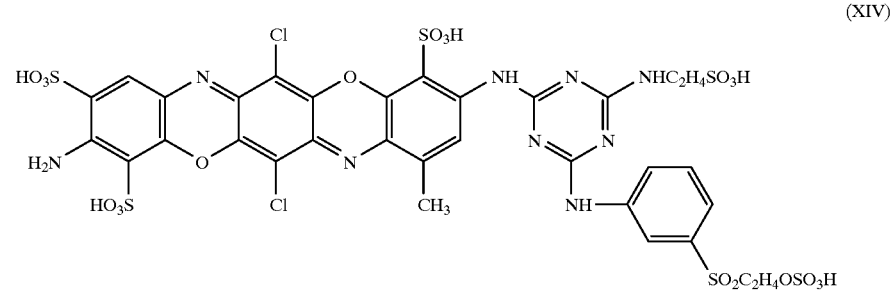

(XIV)

(λmax: 595 nm)

Dyeing Example 1

Into each 200 parts of water were dissolved 0.1, 0.3 and 0.6 part of the compounds of the present invention obtained in Examples 1–3, respectively. After adding 10 parts of sodium sulfate and 10 parts of cotton thereto, the temperature of the mixture was elevated to 60° C. and dyeing was carried out at the same temperature for 1 hour with addition of 4 parts of sodium carbonate. Then, the cotton was washed with water, soaped, washed with water and dried to give a dyed product of reddish blue which was excellent in various fastness and had a good build-up property.

Example 4

The asymmetric triphenodioxazine compound of the formula (XI) was obtained in the same manner as in Example 1. After reacting the compound with cyanuric chloride in the same manner as in Example 1, the reaction in Example 1 was repeated except that taurine was replaced with an equimolar amount of compounds having an amino group as shown by the formulae (1)–(50). Compounds obtained by said reaction were reacted with 1-aminobenzene-3-β-sulfatoethylsulfone to give asymmetric dioxazine compounds of the present invention corresponding to that of the formula (XIII). In case that compounds having an amino group as shown by the formulae (12)–(14) were used, however, the product was isolated by salting-out after reacting with 1-aminobenzene-3-β-sulfatoethylsulfone and the obtained amino alcohol compounds were treated in sulfuric acid to give the corresponding sulfate esters. These asymmetric dioxazine compounds of the present invention were used in dyeing same as that in Dyeing Example 1 to give dyed products of reddish blue in every cases.

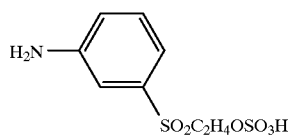
(1)

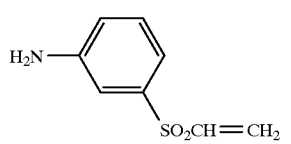
(2)

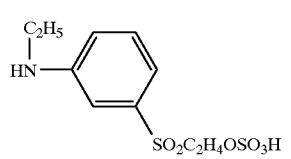
(3)

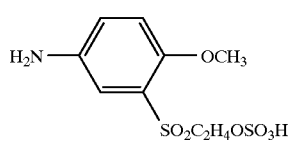
(4)

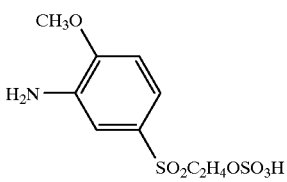
(5)

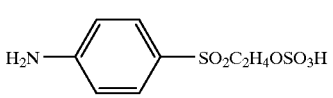
(6)

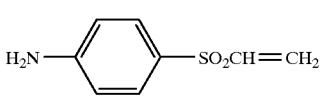
(7)

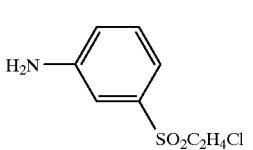
(8)

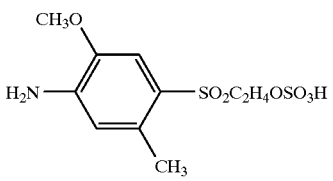
(9)

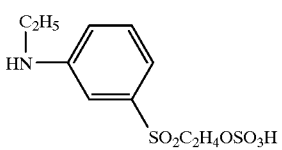
(10)

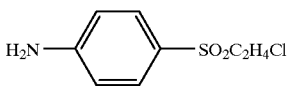
(11)

$H_2NC_2H_4SO_2C_2H_4OH$ (12)

$H_2NC_3H_6SO_2C_2H_4OH$ (13)

$H_2NC_2H_4OC_2H_4SO_2C_2H_4OH$ (14)

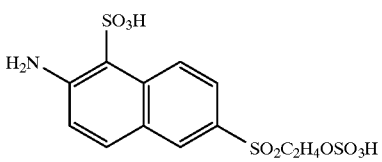
(15)

$H_2NCH_3$ (16)

$H_2NCH_2CH_2CH_2CH_3$ (17)

$HN(CH_3)_2$ (18)

HN(C₂H₅)₂ (19)
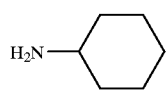 (20)
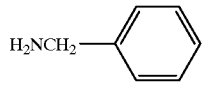 (21)
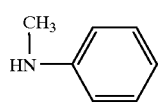 (22)
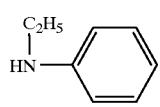 (23)
 (24)
 (25)
HNC₂H₄COOH (26)
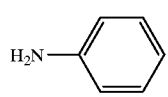 (27)
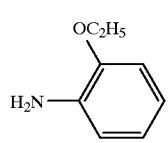 (28)
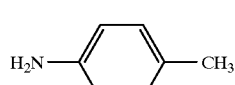 (29)
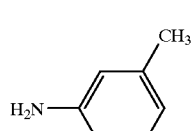 (30)
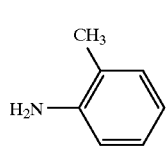 (31)
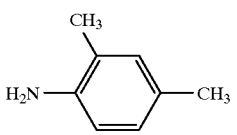 (32)
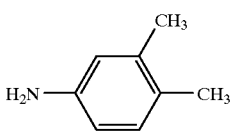 (33)
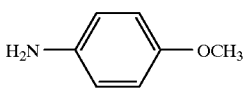 (34)
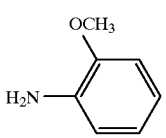 (35)
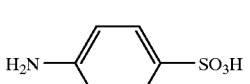 (36)
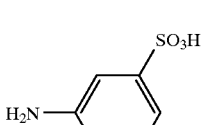 (37)
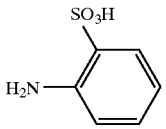 (38)
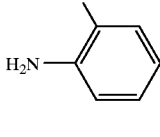 (39)
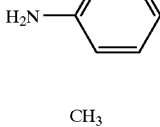 (40)
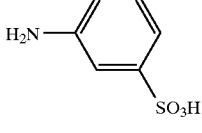 (41)

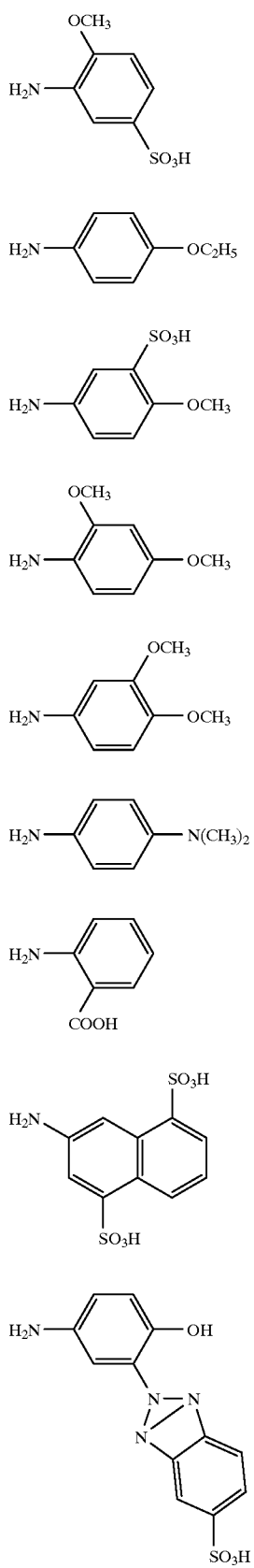

Example 5

The procedure in Example 1 was repeated except that 1,4-phenylenediamine-2-methoxy-5-sulfonic acid was replaced by an equimolar amount of 1,4-phenylenediamine-2-methyl-5-sulfonic acid to give an asymmetric triphenodioxazine compound corresponding to that of the formula (XI). After reacting the compound with cyanuric chloride in the same manner as in Example 1, the reaction in Example 1 was repeated except that taurine was replaced with an equimolar amount of compounds having an amino group as shown by the formulae (1)–(50) described in Example 4. Compounds obtained were reacted with 1-aminobenzene-3-β-sulfatoethylsulfone to give asymmetric dioxazine compounds corresponding to that of the formula (XIV). In case that compounds having an amino group as shown by the formulae (12)–(14) were used, however, the product was isolated by salting-out after reacting with 1-aminobenzene-3-β-sulfatoethylsulfone and the obtained amino alcohol compounds were treated in sulfuric acid to give the corresponding sulfate esters. These asymmetric dioxazine compounds of the present invention were used in the same dyeing as that in Dyeing Example 1 to give dyed products of reddish blue in every cases.

Example 6

The procedure in Example 1 was repeated to give an asymmetric triphenodioxazine compound of the formula (XI). After reacting the compound with cyanuric chloride in the same manner as in Example 1, the reaction in Example 1 was repeated except that taurine was replaced with an equimolar amount of compounds having an amino group as shown by the formulae (1)–(50) described in Example 4 to give asymmetric dioxazine compounds corresponding to that of the formula (XII). These asymmetric dioxazine compounds of the present invention were used in the same dyeing as the in Dyeing Example 1 to give dyed products of reddish blue in every cases.

Example 7

The procedure in Example 1 was repeated except the 1,4-phenylenediamine-2-methoxy-5-sulfonic acid was replaced by an equimolar amount of 1,4-phenylenediamine-2-methyl-5-sulfonic acid to give an asymmetric triphenodioxazine compound corresponding to the formula (XI). After reacting the compound with cyanuric chloride in the same manner as in Example 1, the reaction in Example 1 was repeated except that taurine was replaced with an equimolar amount of compounds having an amino group as shown by the formulae (1)–(50) described in Example 4 to give asymmetric dioxazine compounds of the present invention of the formula (XV) when shown in free acid form. In the general formula (XV), X1 represents the amine residues corresponding to the compounds having an amino group as shown by the formulae (1)–(50). These asymmetric dioxazine compounds of the present invention were used in dyeing of cotton as in Dyeing Example 1 to give dyed products of reddish blue in every cases.

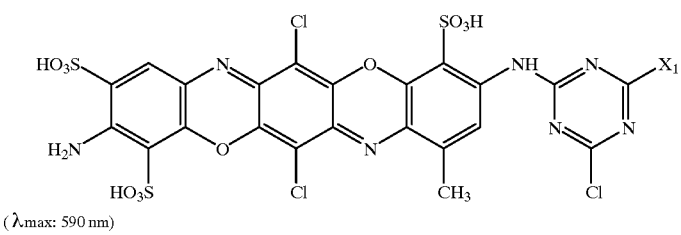
(XV)

(λmax: 590 nm)

Example 8

The procedure in Example 1 was repeated to give an asymmetric triphenodioxazine compound of else formula (XI) Into 1,500 parts of water was dissolved 63.2 parts of the obtained asymmetric triphenodioxazine compound and 19.0 parts of cyanuric fluoride was added thereto at a temperature of 5–30° C. The mixture was stirred until the reaction was over keeping pH at 2–7 with a sodium carbonate solution. Then, 12.4 parts of taurine was added thereto and the reaction was continued at 10–50° C. keeping pH at 2–6. The obtained asymmetric dioxazine compound of the present invention had the following formula (XVI), when shown in free acid form. The asymmetric dioxazine compound was used in dyeing of cotton as in Dyeing Example 1 to give a dyed product of reddish blue.

Example 9

The procedure in Example 1 was repeated to give an asymmetric triphenodioxazine compound of the formula (XI). Into 1,500 parts of water was dissolved 63.2 parts of the obtained asymmetric triphenodioxazine compound and 19.0 parts of cyanuric fluoride was added thereto at a temperature of 5–30° C. The mixture was stirred until the reaction was over keeping pH at 2–7 with a sodium carbonate solution. Then, 24.3 parts of 1-aminobenzene-3-β-sulfatoethylsulfone was added thereto and the reaction was continued at 0–30° C. keeping pH at 2–5. Potassium chloride was added to the mixture and precipitated crystals were isolated to give an asymmetric dioxazine compound of the present invention having the following formula (XVII), when shown in free acid form. The obtained asymmetric dioxazine compound was used in dyeing of cotton as in Dyeing Example 1 to give a dyed product of reddish blue.

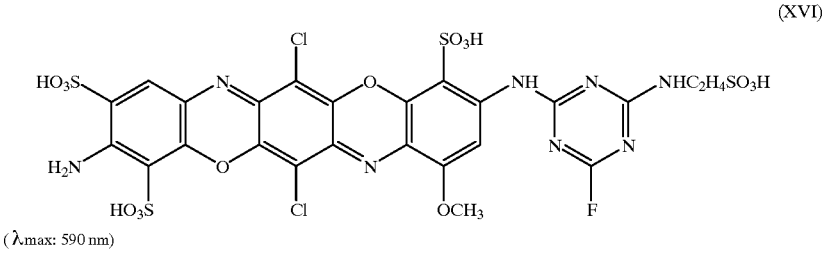
(XVI)

(λmax: 590 nm)

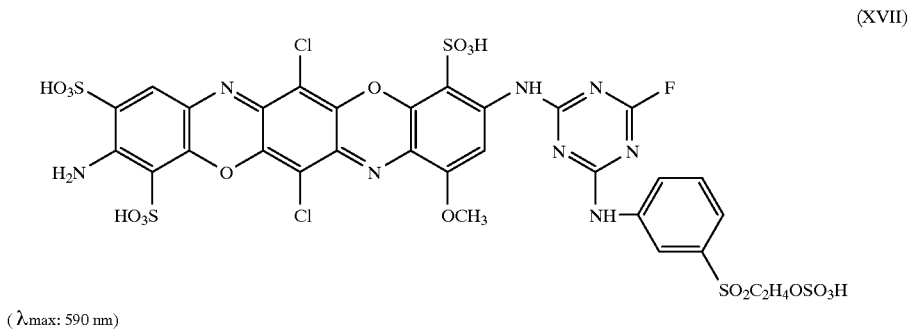
(XVII)

(λmax: 590 nm)

Example 10

The procedure in Example 1 was repeated except that 1,4-phenylenediamine-2-methoxy-5-sulfonic acid was replaced by an equimolar amount of 1,4-phenylenediamine-2-carboxyl-5-sulfonic acid to give an asymmetric triphenodioxazine compound corresponding to the above described formula (XI). Then, cyanuric chloride, taurine and 1-aminobenzene-3-β-sulfatoethylsulfone were reacted thereon in this order in a manner similar to that in Example 1. The obtained reaction solution was treated with potassium chloride to precipitate crystals, which were isolated to give an asymmetric dioxazine compound of the present invention having the following formula as shown in free acid form. The obtained asymmetric dioxazine compound was used in dyeing of cotton as in Dyeing Example 1 to give a dyed product of reddish blue.

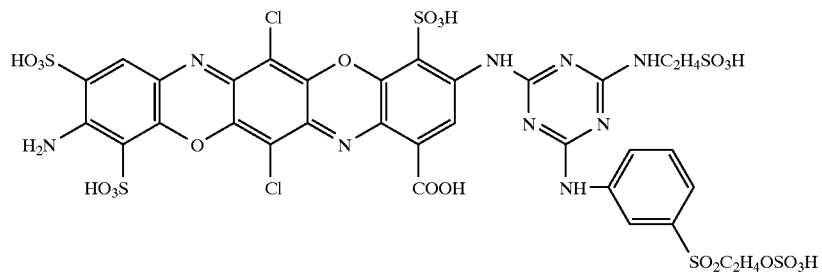

(λmax: 595 nm)

Example 11

The procedure in Example 1 was repeated except that 1,4-phenylenediamine-2-methoxy-5-sulfonic acid was replaced by an equimolar amount of 1,4-phenylenediamine-2-chloro-5-sulfonic acid to give an asymmetric triphenodioxazine compound corresponding to the above described formula (XI). Then, cyanuric chloride, taurine and 1-aminobenzene-3-β-sulfatoethylsulfone were reacted thereon in this order in a manner similar to that in Example 1. The obtained reaction solution was treated with potassium chloride to precipitate crystals, which were isolated. The obtained compound was an asymmetric dioxazine compound of the present invention having the following formula as shown in free acid form. The obtained asymmetric dioxazine compound was used in dyeing of cotton as in Dyeing Example 1 to give a dyed product of reddish blue.

Example 12

The procedure in Example 1 was repeated to give an asymmetric triphenodioxazine compound of the formula (XI). After reacting the compound with cyanuric chloride in the same manner as in Example 1, the reaction in Example 1 was repeated except that taurine was replaced with an equimolar amount of compounds having an amino group as shown by the formulae (3)–(50) described in Example 4. The products were reacted with in the same manner as in Example 1 except that 1-aminobenzene-3-β-sulfatoethylsulfone was replaced by N-ethyl-1-aminobenzene-3-β-sulfatoethylsulfone to give asymmetric dioxazine compounds of the present invention corresponding to the formula (XIII) when shown in free acid form. In case that compounds having an amino group as shown by tie formulae (12)–(14) were used, however, the product was isolated by salting-out after reacting with N-ethyl-1-aminobenzene-3-β-sulfatoethylsulfone and the obtained amino alcohol compounds were treated in sulfuric acid to give the corresponding sulfate esters. These asymmetric dioxazine compounds of the present invention were used in dyeing of cotton as in Dyeing Example 1 to give dyed products of reddish blue in every cases.

Example 13

The procedure in Example 1 was repeated to give an asymmetric triphenodioxazine compound of the formula (XI). After reacting the compound with cyanuric chloride in the same manner as in Example 1, the reaction in Example 1 was repeated except that taurine was replaced with an equimolar amount of compounds having al amino group as shown by the formulae (4)–(50). The products were reacted with in the same manner as in Example 1 except that

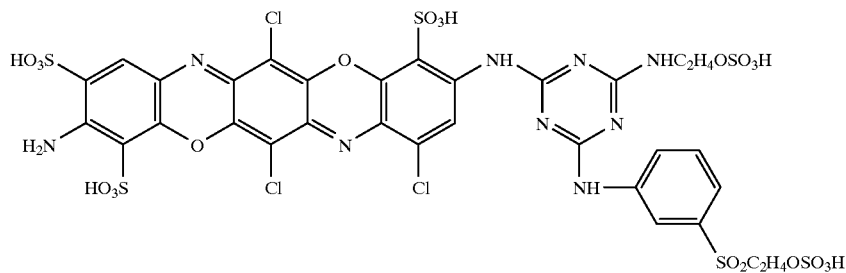

(λ max: 595 nm)

1-aminobenzene-3-β-sulfatoethylsulfone was replaced by 1-amino-4-methoxybenzene-3-β-sulfatoethylsulfone to give asymmetric dioxazine compounds of the present invention corresponding to the formula (XIII) when shown in free acid form. In case that compounds having an amino group as shown by the formulae (12)–(14) were used, however, the product was isolated by salting-out after reacting with 1-amino-4-methoxybenzene-3-β-sulfatoethylsulfone and the obtained amino alcohol compounds were treated in sulfuric acid to give the corresponding sulfate esters. These asymmetric dioxazine compounds of the present invention were used in dyeing of cotton as in Dyeing Example 1 to give dyed products of reddish blue in every cases.

Example 14

The procedure in Example 1 was repeated to give an asymmetric triphenodioxazine compound of the formula (XI). After reacting the compound with cyanuric chloride in the same manner as in Example 1, the reaction in Example 1 was repeated except that taurine was replaced with an equimolar amount of compounds having an amino group as shown by the formulae (5)–(50). The products were reacted with in the same manner as in Example 1 except that 1-aminobenzene-3-β-sulfatoethylsulfone was replaced by 1-amino-2-methoxybenzene-5-β-sulfatoethylsulfone to give asymmetric dioxazine compounds of the present invention corresponding to tile formula (XIII) when shown in free acid form. In case that compounds having an amino group as shown by the formulae (12)–(14) were used, however, the product was isolated by salting-out after reacting with 1-amino-2-methoxybenzene-5-β-sulfatoethylsulfone and the obtained amino alcohol compounds were treated in sulfuric acid to give the corresponding sulfate esters. These asymmetric dioxazine compounds of the present invention were used in dyeing of cotton as in Dyeing Example 1 to give dyed products of reddish blue in every cases.

Example 15

The procedure in Example 1 was repeated to give an asymmetric triphenodioxazine compound of the formula (XI). After reacting the compound with cyanuric chloride in the same manner as in Example 1, the reaction in Example 1 was repeated except that taurine was replaced with an equimolar amount of compounds having an amino group as shown by the formulae (6)–(50). The products were reacted with in the same manner as in Example 1 except that 1-aminobenzene-3-β-sulfatoethylsulfone was replaced by 1-aminobenzene-4-β-sulfatoethylsulfone to give asymmetric dioxazine compounds of the present invention corresponding to the formula (XIII) when shown in free acid form. In case that compounds having an amino group as shown by the formulae (12)–(14) were used, however, the product was isolated by salting-out after reacting with 1-aminobenzene-4-β-sulfatoethylsulfone and the obtained amino alcohol compounds were treated in sulfuric acid to give the corresponding sulfate esters. These asymmetric dioxazine compounds of the present invention were used in dyeing of cotton as in Dyeing Example 1 to give dyed products of reddish blue in every cases.

Example 16

The procedure in Example 1 was repeated to give an asymmetric triphenodioxazine compound of the formula (XI). After reacting the compound with cyanuric chloride in the same manner as in Example 1, the reaction in Example 1 was repeated except that taurine was replaced with an equimolar amount of compounds having an amino group as shown by the formulae (9)–(50). The products were reacted with in the same manner as in Example 1 except that 1-aminobenzene-3-β-sulfatoethylsulfone was replaced by 1-amino-2-methoxy-5-methylbenzene-4-β-sulfatoethylsulfone to give asymmetric dioxazine compounds of the present invention corresponding to the formula (XIII) when shown in free acid form. In case that compounds having an amino group as shown by the formulae (12)–(14) were used, however, the product was isolated by salting-out after reacting with 1-amino-2-methoxy-5-methylbenzene-4-β-sulfatoethylsulfone and the obtained amino alcohol compounds were treated in sulfuric acid to give the corresponding sulfate esters. These asymmetric dioxazine compounds of the present invention were used in dyeing of cotton as in Dyeing Example 1 to give dyed products of reddish blue in every cases.

Example 17

The procedure in Example 1 was repeated to give an asymmetric triphenodioxazine compound of the formula (XI). After reacting the compound with cyanuric chloride in the same manner as in Example 1, the reaction in Example 1 was repeated except that taurine was replaced with an equimolar amount of compounds having an amino group as shown by the formulae (10)–(50). The products were reacted with in the same manner as in Example 1 except that 1-aminobenzene-3-β-sulfatoethylsulfone was replaced by N-ethyl-1-amino-4-methoxybenzene-3-–sulfatoethylsulfone to give asymmetric dioxazine compounds of the present invention corresponding to the formula (XIII) when shown in free acid form. In case that compounds having an amino group as shown by the formulae (12)–(14) were used, however, the product as isolated by salting-out after reacting with N-ethyl-1-amino- 4-methoxybenzene-3-β-sulfatoethylsulfone and the obtained amino alcohol compounds were treated in sulfuric acid to give the corresponding sulfate esters. These asymmetric dioxazine compounds of the present invention were used in dyeing of cotton as in Dyeing Example 1 to give dyed products of reddish blue in every cases.

Example 18

The procedure in Example 1 was repeated to give an asymmetric triphenodioxazine compound of the formula (XI). After reacting the compound with cyanuric chloride in the same manner as in Example 1, the reaction in Example 1 was repeated except that taurine was replaced with an equimolar amount of compounds having an amino group as shown by the formulae (12)–(50). The products were reacted with in the same manner as in Example 1 except that 1-aminobenzene-3-β-sulfatoethylsulfone was replaced by aminoethylsulfonyl ethanol and the products were isolated and dried. Then, the obtained crystals were treated in sulfuric acid. After cooling the reaction solution to the room temperature, potassium chloride was added thereto and precipitated crystals were isolated to give asymmetric dioxazine compounds of the present invention represented by the following formula when shown in free acid form. In the formula, $X_2$ represents the amine residues corresponding to the compounds having an amino group as shown by the formulae (12)–(50). When the compounds having an amino group as shown by the formulae (12)–(14) were used, the compounds obtained by isolating after the salting-out were compounds in which alcohol moieties in the amine residues represented by $X_2$ were converted to sulfate esters. These asymmetric dioxazine compounds of the present invention were used in dyeing of cotton as in Dyeing Example 1 to give dyed products of reddish blue in every cases.
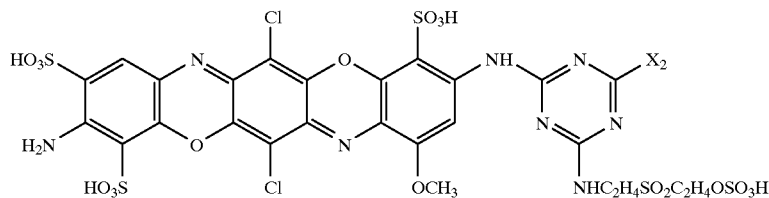
wherein $X_2$ is any one group selected from the group of the formulae shown below:
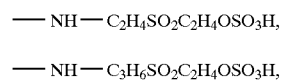
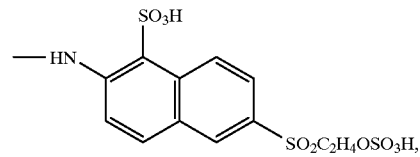
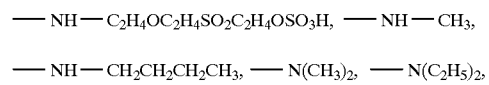
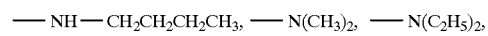
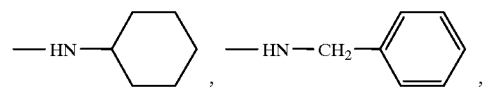
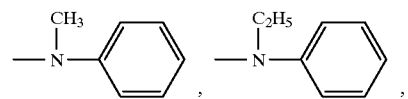
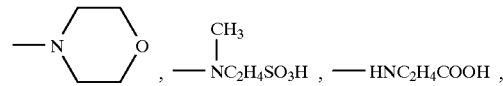
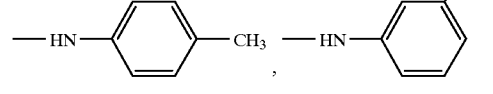
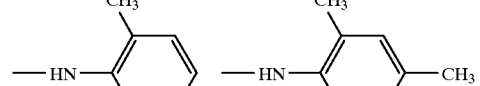
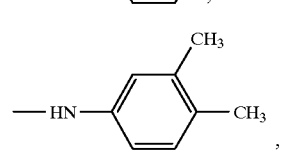
-continued
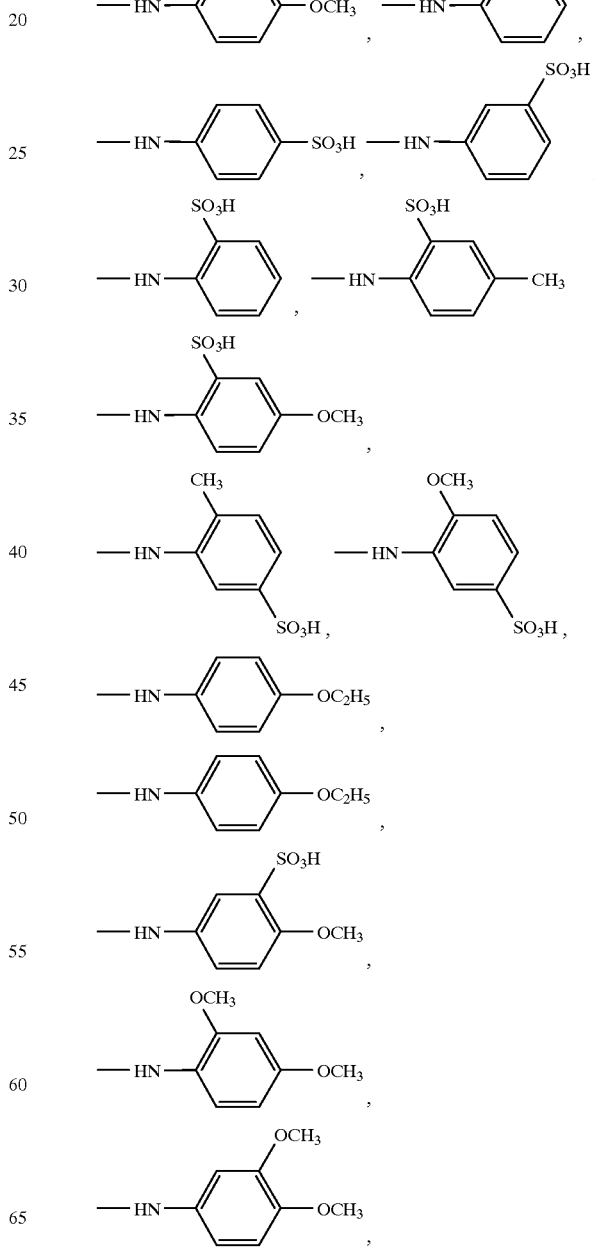

-continued

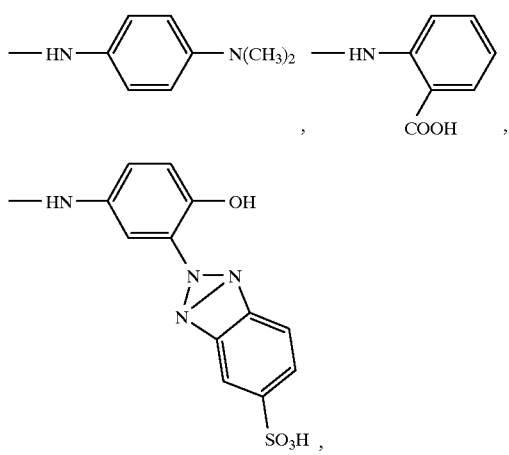

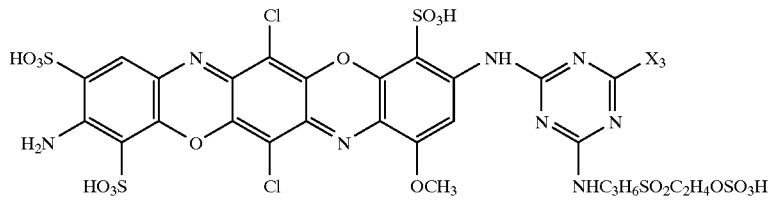

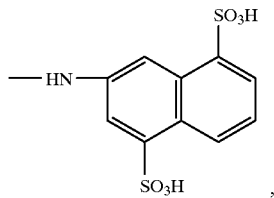

Example 19

The procedure in Example 1 was repeated to give an asymmetric triphenodioxazine compound of the formula (XI). After reacting the compound with cyanuric chloride in the same manner as in Example 1, the reaction in Example 1 was repeated except that taurine was replaced with an equimolar amount of compounds having an amino group as shown by the formulae (13)–(50). The products were reacted with in the same manner as in Example 1 except that 1-aminobenzene-3-β-sulfatoethylsulfone was replaced by aminopropylsulfonyl ethanol and the products were isolated and dried. Then, the obtained crystals were treated in sulfuric acid. After cooling the reaction solution to the room temperature, potassium chloride was added thereto and precipitated crystals were isolated to give asymmetric dioxazine compounds of the present invention represented by the following formula when shown in free acid form. In the formula, $X_3$ represents the amine residues corresponding to the compounds having an amino group as shown by the formulae (13)–(50). When the compounds having an amino group as shown by the formulae (13) and (14) were used, the compounds obtained by isolating after the salting-out were compounds in which alcohol moieties in the amine residues represented by $X_3$ were converted to sulfate esters. These asymmetric dioxazine compounds of the present invention were used in dyeing of cotton as in Dyeing Example 1 to give dyed products of reddish blue in every cases.

Example 20

The procedure in Example 1 was repeated to give an asymmetric triphenodioxazine compound of the formula (XI). After reacting tile compound with cyanuric chloride in the same manner as in Example 1, the reaction in Example 1 was repeated except that taurine was replaced with an equimolar amount of compounds having an amino group as shown by the formulae (14)–(50). The products were reacted with in the same manner as in Example 1 except that 1-aminobenzene-3-β-sulfatoethylsulfone was replaced by aminoethoxyethylsulfonyl ethanol and the products were isolated and dried. Then, the obtained crystals were treated in sulfuric acid. After cooling the reaction solution to the room temperature, potassium chloride was added thereto and precipitated crystals were isolated to give asymmetric dioxazine compounds of the present invention represented by the following formula when shown in free acid form. In the formula, $X_4$ represents the amine residues corresponding to the compounds having an amino group as shown by the formulae (14)–(50). When the compound having an amino group as shown by the formula (14) was used, the compound obtained by isolating after the salting-out was a compound in which alcohol moieties in the amine residue represented by $X_4$ was converted to sulfate ester. These asymmetric dioxazine compounds of the present invention were used in dyeing of cotton as in Dyeing Example 1 to give dyed products of reddish blue in every cases.

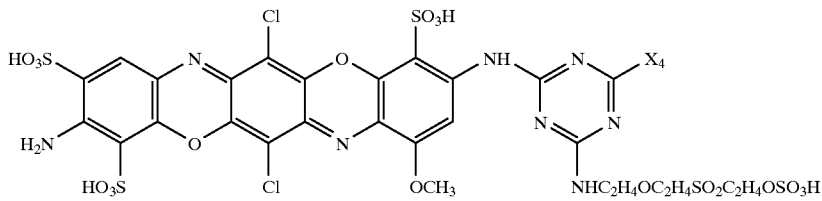

Example 21

The procedure in Example 1 was repeated to give an asymmetric triphenodioxazine compound of the formula (XI). After reacting the compound with cyanuric chloride in the same manner as in Example 1, the reaction in Example 1 was repeated except that taurine was replaced with an equimolar amount of compounds having an amino group as shown by the formulae (15)–(50). The products were reacted with in the same manner as in Example 1 except that 1-aminobenzene-3-β-sulfatoethylsulfone was replaced by 2-amino-1-sulfo-6-β-sulfatoethylsulfone to give asymmetric dioxazine compounds of the present invention shown by the following formula when shown in free acid form. In the formula, $X_5$ represents the amine residues corresponding to the compounds having an amino group as shown by the formulae (15)–(50). These asymmetric dioxazine compounds of the present invention were used in dyeing of cotton as in Dyeing Example 1 to give dyed products of reddish blue in every cases.

formulae (1)–(16) and the reaction products were isolated and dried to give asymmetric dioxazine compounds of the present invention represented by the following formula when shown in free acid form. In the formula, $X_6$ represents the amine residues corresponding to the compounds having an amino group as shown by the formulae (1)–(16). When the compounds having an amino group as shown by the formulae (12)–(14), the compounds obtained by isolating and drying were treated in sulfuric acid. The reaction solution cooled to the room temperature was treated with salt and precipitated crystals were isolated. The obtained compounds of the present invention were compounds in which alcohol moieties in the amine residues represented by $X_6$ were converted to sulfate esters.

These asymmetric dioxazine compounds of the present invention were used in dyeing of cotton as in Dyeing Example 1 to give dyed products of reddish blue in every cases.

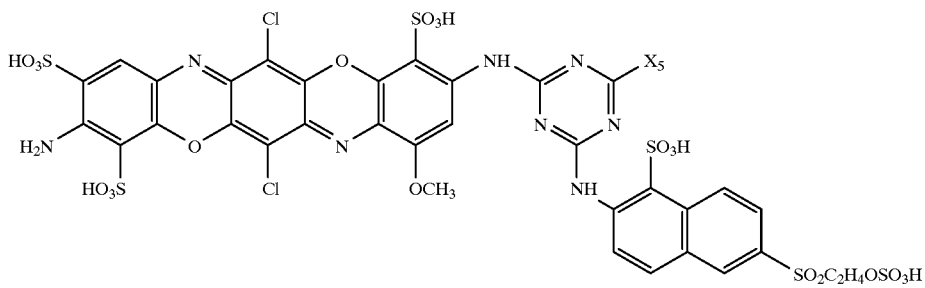

Example 22

The procedure in Example 1 was repeated to give an asymmetric triphenodioxazine compound of the formula (XI). Then, the compound was reacted in the same manner as in Example 1 except that cyanuric chloride was replaced by an equimolar mount of 2-methoxy-4,6-dichloro-s-triazine. Further, the reaction in Example 1 was repeated except that taurine was replaced with an equimolar amount of compounds having an amino group as shown by the

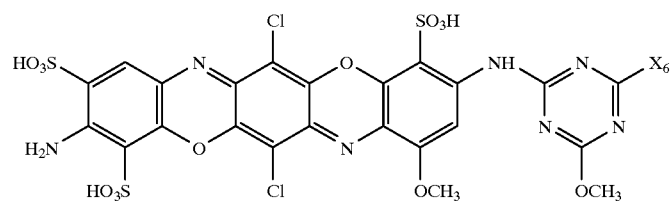

Example 23

Into water were dissolved 84.7 parts of 1,4-phenylenediamine-3-methyl-2,6-disulfonic acid and 65.5 parts of 1,4-phenylenediamine-2-methoxy-5-sulfonic acid.

Then, 73.8 parts of chloranil was added and the mixture was adjusted to Ph 4–8 at the room temperature and stirred until the reaction was over. The mixture was subjected to salting-out and the formed crystals were separated and dried. The obtained dianilide compound was represented by the following structure, when shown in free acid form:

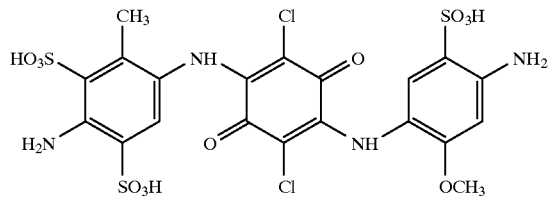

To 4,500 parts of 3–30% fuming sulfuric acid was added 72.0 parts of the obtained dianilide compound at 0–15° C. and the mixture was stirred at 15–40° C. until the reaction was over. The reaction solution was poured into ice-water and precipitated crystals were filtered. The obtained cake was mixed with water and the mixture was adjusted to Ph 3–6 with sodium hydroxide. Then the mixture was subjected to salting-out with sodium chloride and the precipitated crystals were separated by filtration. The obtained asymmetric triphenodioxazine compound had a structure of the following formula, when shown in free acid form:

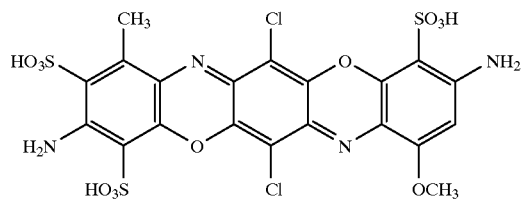

Cyanuric chloride, taurine and 1-aminobenzene-3-β-sulfatoethylsulfone were reacted with 65.0 parts of the asymmetric triphenodioxazine compound in this order in a manner similar to that in Example 1. The obtained reaction solution was treated with potassium chloride to precipitate crystals, which were isolated to give an asymmetric dioxazine compound of the present invention having the following formula as shown in free acid form. The obtained asymmetric dioxazine compound was used in dyeing as in Dyeing Example 1 to give a dyed product of reddish blue.

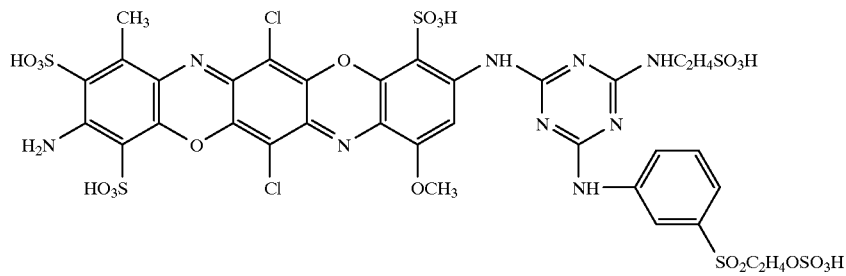

Printing Example 1

Each of the asymmetric dioxazine compounds of the present invention used in Dyeing Example 1, other additives shown below and water were used to formulate a color paste having the following composition:

| | |
|---|---|
| Asymmetric dioxazine compound | 5 parts |
| Urea | 5 parts |
| Sodium alginate (5%) stock paste | 20 parts |
| Hot water | 25 parts |
| Sodium hydrogen carbonate | 2 parts |
| Water | 13 parts |

A mercerized cotton broad cloth was printed with the color paste, and after pre-drying, treated with steam at 100° C. for 5 minutes, rinsed with warm water and dried. Each of the obtained printed product was excellent in various fastness, particularly in chlorine fastness, and had a good build-up property.

What is claimed is:
1. An asymmetric triphenodioxazine compound represented, when shown in free acid form, by the general formula (IV):

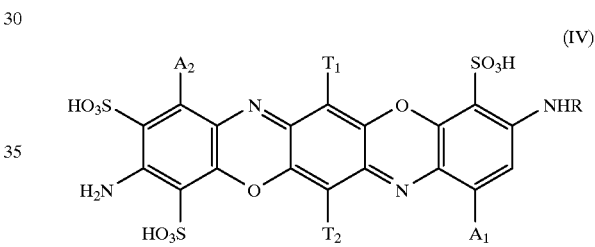

wherein $T_1$, $T_2$ are the same or different and each represent a hydrogen atom, a chlorine atom, a bromine atom, a $C_1$–$C_4$ alkyl group, a $C_1$–$C_4$ alkoxy group or a phenoxy group, $A_1$ represents a $C_1$–$C_4$ alkyl group, a $C_1$–$C_4$ alkoxy group, a chlorine atom, a bromine atom or a carboxyl group, $A_2$ represents a hydrogen atom, a $C_1$–$C_4$ alkyl group, a $C_1$–$C_4$ alkoxy group, a chlorine atom, a bromine atom or a carboxyl group and R represents a hydrogen atom or a lower alkyl group which may be substituted.

* * * * *